US006490050B2

(12) United States Patent
Ito

(10) Patent No.: US 6,490,050 B2
(45) Date of Patent: *Dec. 3, 2002

(54) PRINTING APPARATUS AND CONTROL METHOD FOR SAME, AND A DATA STORAGE MEDIUM RECORDING THE CONTROL METHOD

(75) Inventor: Yoshikazu Ito, Matsumoto (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,816

(22) Filed: Sep. 4, 1998

(65) Prior Publication Data

US 2001/0013945 A1 Aug. 16, 2001

(30) Foreign Application Priority Data

Sep. 5, 1997 (JP) ............................................ 9-240928

(51) Int. Cl.[7] ............................................... G06F 13/00

(52) U.S. Cl. ....................... 358/1.14; 358/1.12; 399/16; 399/68

(58) Field of Search ................................ 358/1.5, 1.12, 358/1.13, 1.14, 1.15; 399/16, 23, 68, 367, 370, 371, 372, 388, 392; 271/171, 258.01; 347/104, 262, 264, 32, 218; 400/600.3, 617, 636

(56) References Cited

U.S. PATENT DOCUMENTS 4,518,271 A 5/1985 Hirata ........................ 400/625
4,734,868 A * 3/1988 DeLay ....................... 364/519
5,226,743 A 7/1993 Jackson et al. ............. 400/625
5,644,348 A * 7/1997 Shimoyama et al. ......... 347/37
5,965,862 A * 10/1999 Momose ..................... 235/499

FOREIGN PATENT DOCUMENTS

EP 0 395 003 10/1990
FR 2 720 331 12/1995
JP 62-21863 9/1987
JP 64-7136 1/1989
JP 5-68989 9/1993

* cited by examiner

*Primary Examiner*—Mark Wallerson

(57) ABSTRACT

Paper jams and damage to a printing medium resulting from movement of a print head carriage are prevented in a printing apparatus in which the print head unit moves orthogonally to the direction in which the printing medium, which may be slip form, is transported through a transportation path to the printing unit for printing. A pair of transportation rollers are supported on opposing sides of the transportation path in a manner enabling the transportation rollers to close and open. The transportation rollers are closed to hold and transport the slip form in the transportation path to the printing unit. A driver is controlled to open and close the transportation rollers according to a control command. When a non-print control command involving print head movement is received, the driver is controlled to close the transportation rollers.

37 Claims, 7 Drawing Sheets

PRINTING APPARATUS AND CONTROL METHOD FOR SAME, AND A DATA STORAGE MEDIUM RECORDING THE CONTROL METHOD

BACKGROUND OF THE INVENTION

1. Field of the Invention

The present invention relates to a printing apparatus in which the print head travels orthogonally to the direction in which the printing medium travels in order to print to the printing medium. More specifically, the present invention relates to a printing apparatus having a novel means for preventing paper jams accompanying movement of the print head, a control method for the printing apparatus, and a data storage medium storing the control method of the invention.

2. Description of the Related Art

Impact printers, thermal printers, inkjet printers, and other printers that print by moving a carriage-mounted print head orthogonally to the direction in which the printing medium travels are widely used and commonly available. Most printers used in conjunction with cash registers and point-of-sale terminals for printing slip forms are of this type. This category of printers includes printers requiring the user to place the printing form at a particular location in the printing unit. Such printers have an openable/closable transportation roller for clamping and holding the form for printing. When the user then initiates printing and a print command is sent from the host device to the printer, the transportation roller closes to clamp and hold the form. The transportation roller is then driven to advance the form into the printing unit, and printing begins.

As taught by Japan Unexamined Utility Model Publication (jikkai) 5-68989, this type of printer can automatically eject any medium present in the transportation path when the power is turned on as a means of preventing paper jams.

When a "return home" or similar command is received from the host after the power is turned on and a form is set in the printing unit, the carriage in this type of printer moves across the form to the standby position, known as the home position. The form, however, may be wrinkled, have folded corners, or otherwise be raised off of the platen and interfere with print head movement at this time because the form is not clamped by the transportation roller. The carriage may therefore catch on the form or tear the form, resulting in a paper jam.

This is a particular problem in printers having a straight transportation path for printing to slip forms. In printers with a curved transportation path the curves in the transportation path increase the stiffness of the printing medium, and help to keep the printing medium away from the carriage path. This is not the case in printers with a straight transportation path, and the loose printing medium thus tends to wander into the path of the print head carriage.

There is therefore a need for a printing apparatus whereby paper jams and damage to the printing medium can be prevented by either constantly clamping the printing medium with a transportation roller when the print head carriage moves, or ejecting the printing medium before carriage movement.

Objects of the Invention

Therefore, it is an object of the present invention to overcome the aforementioned problems.

It is a another object of the present invention to provide a printing apparatus that includes a transportation roller mechanism that holds the printing medium whenever the carriage on which a print head is mounted moves to prevent the printing medium from protruding into the path of the carriage and causing paper jams and/or damage to the printing medium.

SUMMARY OF THE INVENTION

The present invention addresses the above-noted need by providing a printing apparatus for printing to a printing medium by moving a print head orthogonally to the direction in which the printing medium is transported along a transportation path to a printing unit. More specifically, a printing apparatus according to the present invention comprises a transportation roller pair selectively movable between an open position and a closed position in which the transportation roller pair holds and transports the printing medium along the transportation path to the printing unit, and a driver to open and close the transportation roller pair based on a control command. When a control command involving print head movement is received, the driver is controlled to close the transportation roller pair. As a result, the printing medium is always held by the transportation roller pair when the print head moves.

Control commands involving print head movement (simply "commands" below) include, for example, a return home command moving the print head to a standby position, and printer initialization commands.

The printing apparatus according to the present invention can further comprise a medium detector to detect if the printing medium is inserted in the transportation path. In this case, the driver is controlled to close the transportation roller pair only when insertion of the printing medium has been detected by the medium detector as being correctly positioned. The transportation roller pair is thus not closed when the printing medium is not present in the transportation path, and noise accompanying transportation roller operation can be reduced.

The driver can be further controlled to open the transportation roller pair after closing the transportation roller pair and executing a control command involving print head movement. This enables the user to remove and reinsert a printing medium as necessary or desired.

The printing apparatus according to the present invention can further comprise a medium position detector to detect if the printing medium is correctly positioned in the transportation path. In this case, the driver is controlled to not open the transportation roller pair when the printing medium is correctly positioned after closing the transportation roller pair and executing a control command involving print head movement, and to otherwise open the transportation roller pair. Whether the printing medium is correctly positioned or not can be determined using a medium leading edge detector to detect the leading edge of the printing medium, and a medium side edge detector to detect the side edge of the printing medium.

The printing apparatus of the invention can be further comprised to drive the transportation roller pair and eject the printing medium after closing the transportation rollers. In this case, the printing medium is preferably ejected to the open insertion side of the transportation path.

By thus controlling the driver to open the transportation roller pair after ejecting the printing medium and implementing a control command involving print head movement, the user can reinsert the printing medium as necessary or desired.

The present invention is particularly suited to printing apparatuses having a relatively straight printing medium transportation path.

The present invention further addresses the above-noted need by providing a control method for a printing apparatus. The printing apparatus in this case prints to a printing medium by moving a print head orthogonally to the transportation direction of the printing medium, and comprises a transportation roller pair selectively movable between an open position and a closed position in which the transportation roller pair holds and transports the printing medium to the printing unit, and a driver to open and close the transportation roller pair based on a control command. The control method comprises controlling the driver to close the transportation roller pair when a control command involving print head movement is received, and moving the print head according to the control command.

The invention further provides a control method for a printing apparatus for printing to a printing medium by moving a print head orthogonally to the transportation direction of the printing medium. The printing apparatus comprises a transportation roller pair selectively movable between an open position and a closed position in which the transportation roller pair holds and transports the printing medium to the printing unit, a driver to open and close the transportation roller pair based on a control command, and a medium detector to detect if a printing medium is correctly positioned in the transportation path. The control method in this case comprises detecting whether the printing medium is inserted in the transportation path using the medium detector when a control command involving print head movement is received, controlling the driver to close the transportation roller pair when the printing medium is correctly positioned and detected, and moving the print head according to the control command.

The control method of the invention further preferably comprises controlling the driver to not open the transportation roller pair when the printing medium is correctly positioned based on the detection result of the medium position detector, and otherwise controlling the driver to open the transportation roller pair.

The control method of the invention yet further preferably comprises ejecting the printing medium using the transportation roller pair after controlling the driver to close the transportation roller pair.

The control method of the invention can also be provided as a control program for controlling a printing apparatus, and the control program can be recorded and stored on any computer-readable storage medium. The control program can also be provided over the Internet or other computer network for downloading and storage to a storage medium in or connected to the user's computer or printing apparatus from which the program is used.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

Key to the figures.

P slip form

P printing apparatus

2 tray

3 front cover

4 paper guide

5 operating panel

6 CPU

7 ROM

8 interface

9 RAM

10 printing unit

11 print head unit

11*a* print head

12 carriage

13 guide shaft

14 drive motor

15*a*, 15*b* transportation rollers

16 form stop

17 plunger

18, 19 form detectors

20 host

DESCRIPTION OF THE PREFERRED EMBODIMENTS

The preferred embodiments of the present invention are described below with reference to the accompanying figures. FIG. 1 to FIG. 4 are various views of a printing apparatus according to the present invention, FIG. 1 being an oblique view showing the appearance of the printing apparatus, FIG. 2 being an oblique view in which the major parts of the printing unit are highlighted with solid lines, FIG. 3 being a typical side view of the printing unit, and FIG. 4 being a functional block diagram of the printing apparatus. Note that a dot impact printer for printing checks and other slip forms in connection with a cash register or point-of-sale (POS) terminal is and exemplary application of the printing apparatus 1 of the present embodiment.

Figure 1:
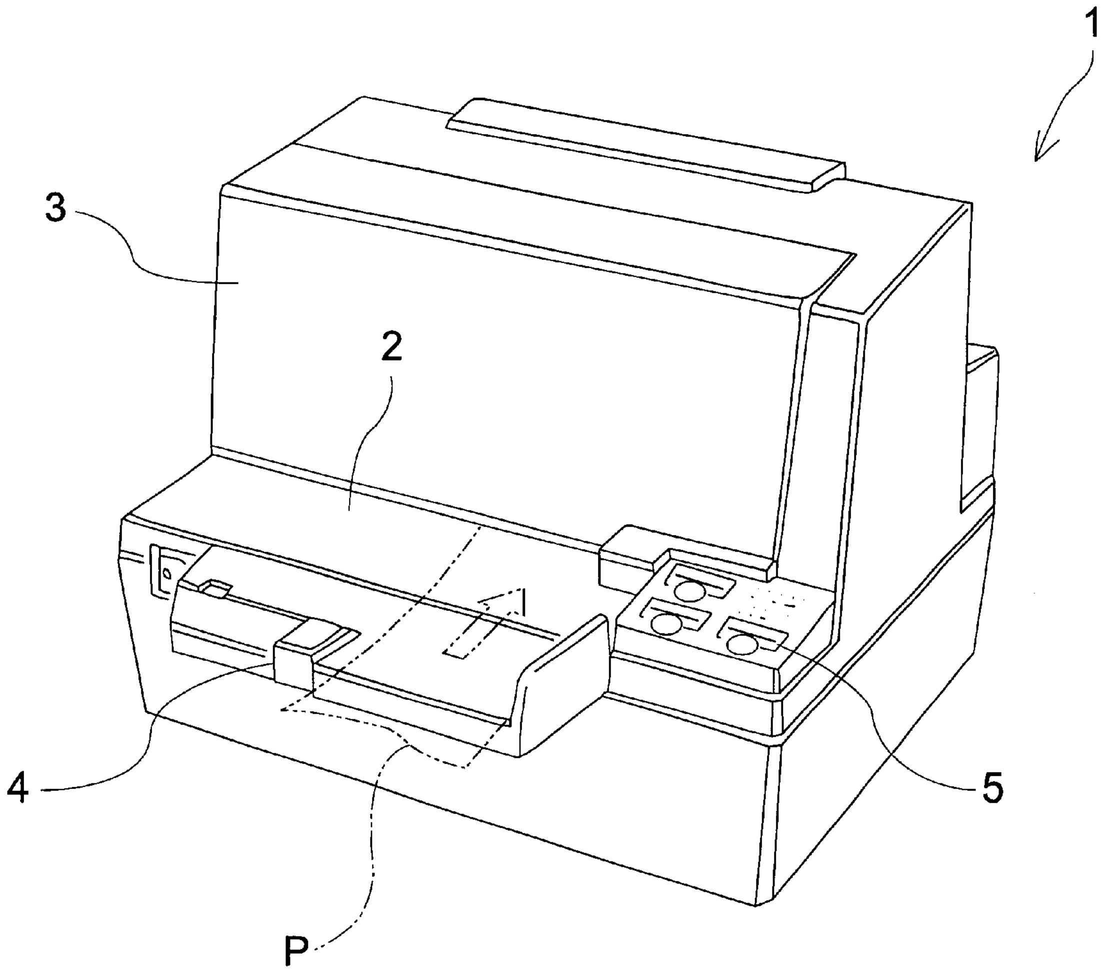
FIG. 1 is an oblique view of a printing apparatus according to a preferred embodiment of the present invention.

As shown in FIG. 1, a tray 2 for setting slip forms P to be printed is disposed at the front of the printing apparatus 1 as viewed in FIG. 1. This tray 2 leads to the printing unit 10 located inside the front cover 3. A slip form P is manually placed on the tray 2 with its leading edge inserted to the printing unit 10, and is transported linearly along the tray 2 by means of a pair of transportation rollers 15*a* and 15*b* described further below. A paper guide 4 on the tray 2 is adjustable to the width of the slip forms P, and can thus guide slip forms P of different widths. An operating panel 5 is disposed to the right of the tray 2. The operating panel 5 contains buttons for feeding, ejecting, and releasing the slip forms P, as well as LEDs for indicating various printer states.

Figure 2:
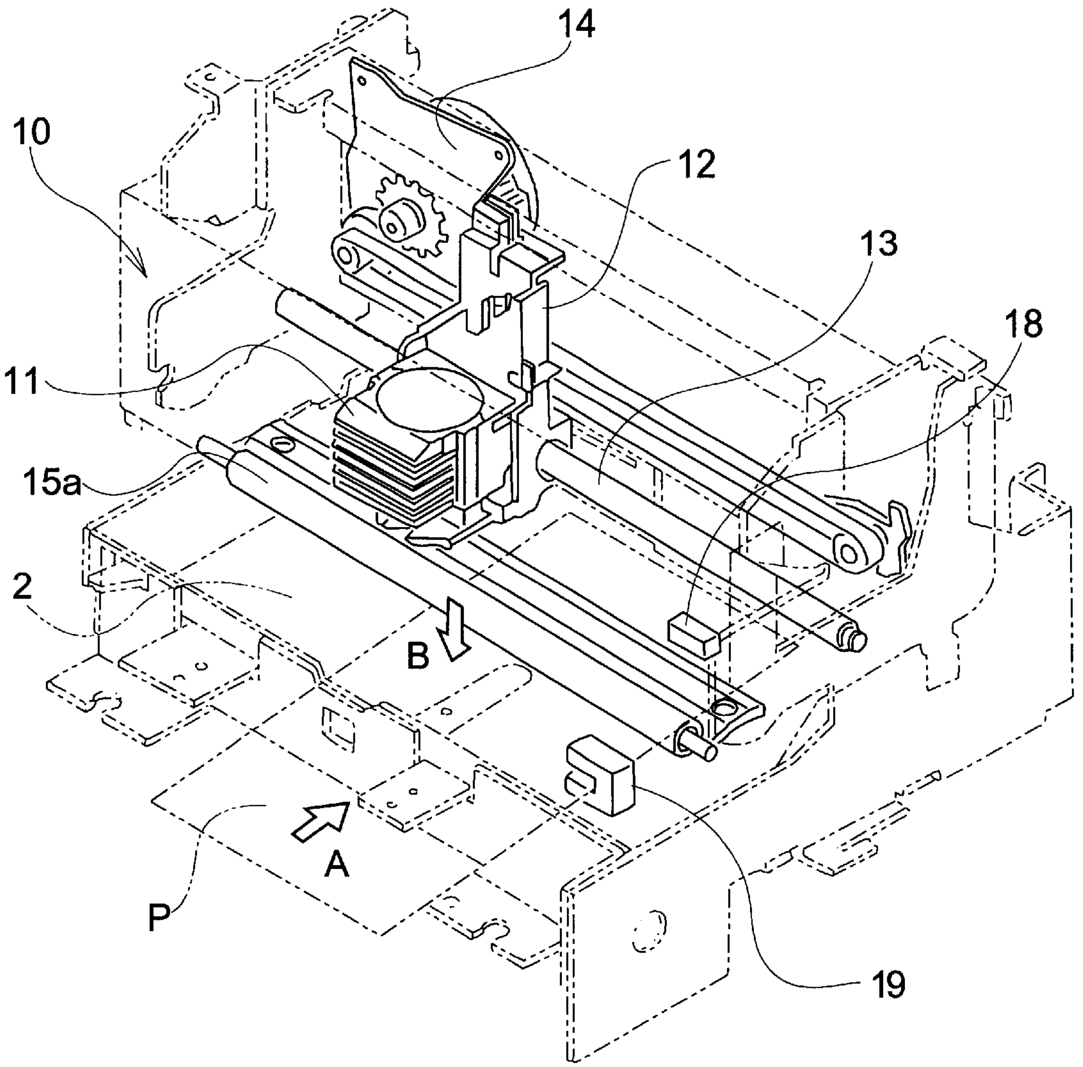
FIG. 2 is an oblique view of the major parts of the printing unit in the printing apparatus shown in FIG. 1.
Figure 3:
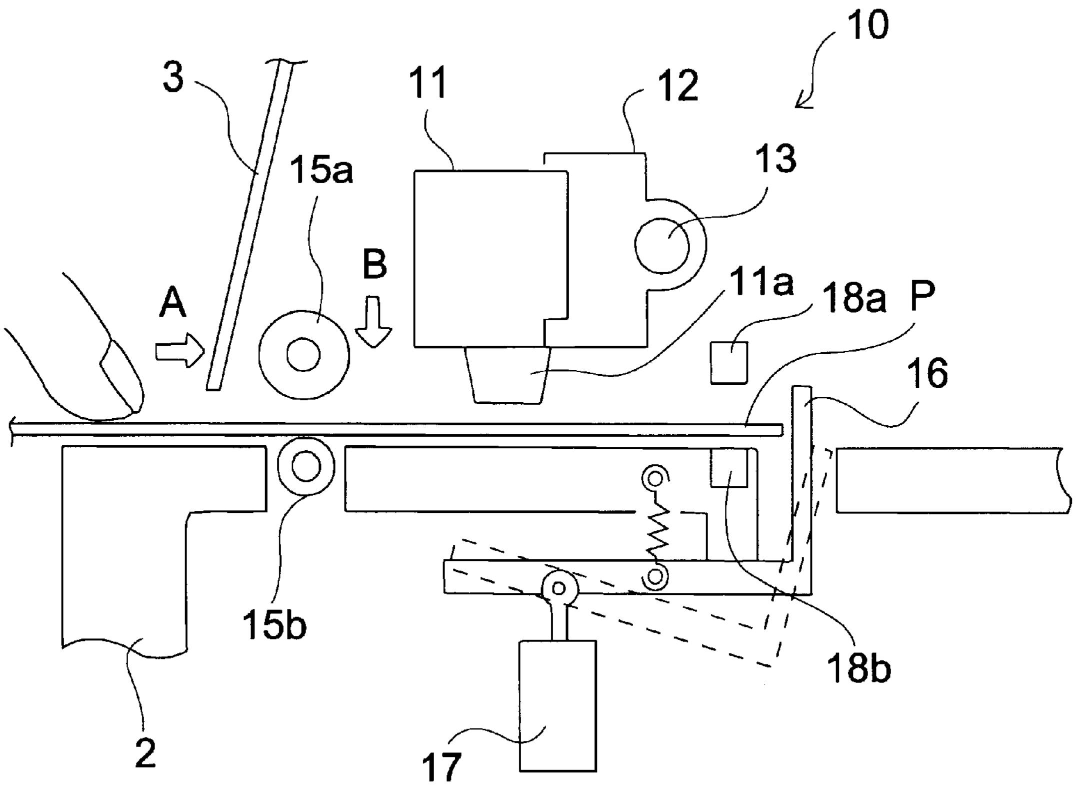
FIG. 3 is a typical side view of the printing unit in the printing apparatus shown in FIG. 1.

Referring to FIGS. 2 and 3, the printing unit 10 of this printing apparatus 1 comprises a print head unit 11. A dot impact type print head 11*a* is disposed on the bottom of the print head unit 11 facing the tray 2. The print head unit 11 is replaceably mounted to a carriage 12, which is supported on a guide shaft 13. The print head unit 11 can thus travel freely widthwise to the printing medium by driving a drive motor 14 to move the carriage 12 along the guide shaft 13.

The transportation rollers 15 are disposed in the transportation path in front of the print head unit 11 as seen in FIG. 2. Of the two transportation rollers 15*a* and 15*b,* one is a drive roller connected to a drive power source, and the other is an idler roller that follows the rotation of the drive roller. The transportation rollers 15 clamp a slip form P inserted therebetween to the printing unit 10 to transport the form in the direction of arrow A in FIG. 2. A form can also be transported in the direction opposite arrow A by simply driving the transportation rollers 15 in the opposite direction.

One transportation roller 15*a* is supported so that it can be moved up and down by an actuator. Transportation roller 15*a* is selectively movable between a down or closed position to hold a form pressed against the other transportation roller 15*b* and an up or open position to release the form held therebetween. When a slip form P is inserted to the printing unit 10, the transportation roller 15*a* is thus separated from the transportation roller 15*b* as shown in FIG. 3. When the slip form P is to be transported, the transportation roller 15*a* descends in the direction of arrow B and contacts the form, thereby enabling form transportation. A stepping motor can be used to power and drive the transportation rollers 15. The stepping motor also makes it possible to accurately control the distance a form is transported based on the rotational distance of the motor, that is, the number of steps the motor advances.

A form stop 16 is provided for positioning the slip form P in the transportation direction. When the user inserts a slip form P to the printing unit 10, the form stop 16 obstructs the path at a point inside from the tray 2 as indicated by the solid line representation of the form stop 16 in FIG. 3. When a slip form P is placed in the printing unit and transportation by the transportation rollers 15 begins, the form stop 16 is retracted from the transportation path by a plunger 17 as indicated by the solid line in FIG. 3, thereby enabling the slip form P to advance.

The printing apparatus 1 further comprises two form detectors 18 and 19. As shown in FIG. 3, the one detector 18 comprises an optical emitter 18*a* and a receptor 18*b* disposed in opposition above and below the transportation path in proximity to the form stop 16. When a slip form P is placed in the printing unit 10 and the leading edge thereof advances between the optical emitter 18*a* and receptor 18*b,* light from the optical emitter 18*a* is interrupted by the form. It can therefore be confirmed that a slip form P is set in the transportation path. The other detector 19 is disposed at one side of the tray 2 as shown in FIG. 2. This detector 19 also comprises an optical emitter and a receptor, housed in a U-shaped frame. As a result, the detector 19 can determine when the edge of a slip form P has been inserted.

The form stop 16 and transportation rollers 15 work with the form detector 18 to index and position the leading edge of the form. At the start of this process the form stop 16 blocks the transportation path. When a user inserts a slip form P to the tray 2, the leading edge of the form meets the form stop 16, and is prevented thereby from advancing further. When the form detector 18 detects a slip form P, the one transportation roller 15*a* descends and the transportation rollers 15 clamp the slip form P. The transportation rollers 15 are then driven in reverse direction, that is, opposite the direction in which the form is fed for printing, until the form detector 18 detects that the leading edge of the slip form P has backed out of the form detector 18. As a result of this sequence, the slip form P is indexed to a precise location.

After the slip form P is positioned as described above, the location of the leading edge of the form in the transportation path can be estimated from the distance between the form detector 18 and the transportation roller 15, and the distance the transportation rollers 15 turned.

Figure 4:
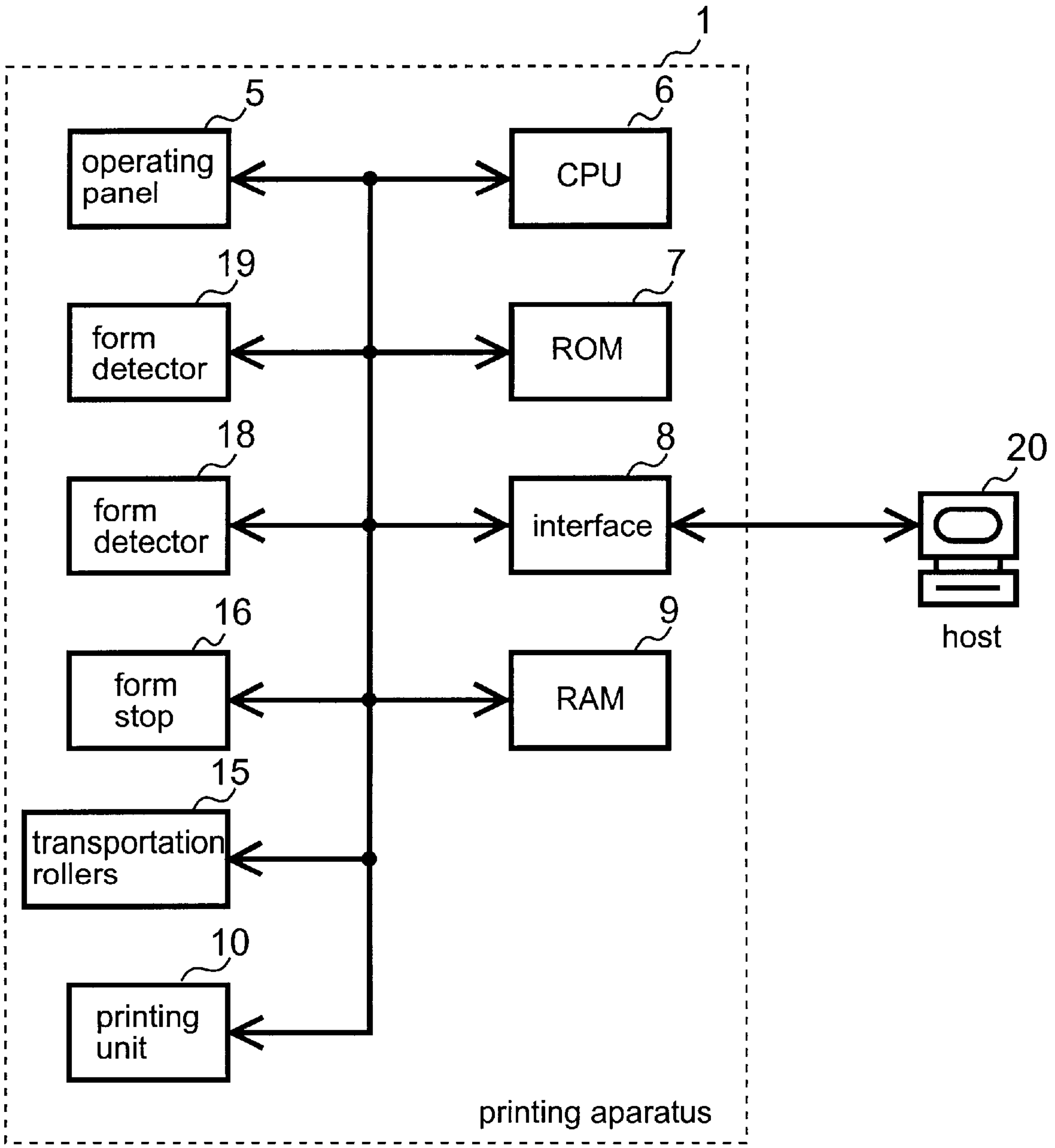
FIG. 4 is a block diagram of the printing apparatus shown in FIG. 1.

Referring to FIG. 4, the central processing unit (CPU) 6 of the printing apparatus 1 is able to determine that the slip form P is set to the appropriate position in the printing unit based on the detection results of the form detectors 18 and 19. The CPU 6 reads the current state of the form detectors 18 and 19, and controls and drives the form stop 16, transportation rollers 15, and printing unit 10 as required. The control program executed by the CPU 6 is read by the CPU 6 from read-only memory (ROM) 7 when the printing apparatus 1 is turned on.

The interface 8 of the printing apparatus 1 receives control commands sent from the host 20, and buffers the received commands to random access memory (RAM) 9. RAM 9 also functions as temporary data storage.

The CPU 6 interprets control command buffered to RAM 9. When a character print command is received, the CPU 6 reads the font definition from ROM 7 and writes a print image to the RAM 9. If a form is loaded to the printing unit 10, the CPU 6 drives the printing unit 10 to print the developed print image, and drives the transportation rollers 15 to advance the form after completing the print line. The processes whereby these control commands are received and interpreted, print images are developed, and characters are printed to a form are known in the art, and further description thereof is thus omitted below.

The CPU 6 is connected to the form detectors 18 and 19, form stop 16, transportation roller 15, printing unit 10, operating panel 5, ROM 7, interface 8, and RAM 9 via a signal bus or other means known in the art.

The operation whereby the printing apparatus 1 prints to a slip form P is described immediately below.

When a user inserts a slip form P to the printing unit 10 after a print command has been sent from the host 20 (for example, a cash register) connected to the printing apparatus 1, the form detectors 18 and 19 detect form presence and notify the CPU 6. If the CPU 6 determines that a slip form P is appropriately set in the printing unit 10, that is, is positioned for printing, an actuator (not shown in the figures) is driven to lower the transportation roller 15*a,* and the plunger 17 is driven to retract the form stop 16 from the transportation path. The print head unit 11 is then moved widthwise to the slip form P and the slip form P is printed. The slip form P is advanced one line at a time by the transportation rollers 15 to sequentially supply a fresh printing area to the print head 11*a* as each line is printed.

Non-print commands can also be supplied to the printing apparatus 1, including commands for moving the carriage 12. A return home command (ESC <) causing the carriage 12 to return to the home position, and a printer initialization command (ESC @) are examples of these non-print commands. Note that the printer initialization command (ESC @) cancels any printer mode settings, line feed distance settings, and other user-controllable settings to restore the default settings, and is output when the power to printing apparatus 1 is turned on and when resetting the printer.

A control method for a printing apparatus 1 according to the present invention is described next below.

Figure 5:
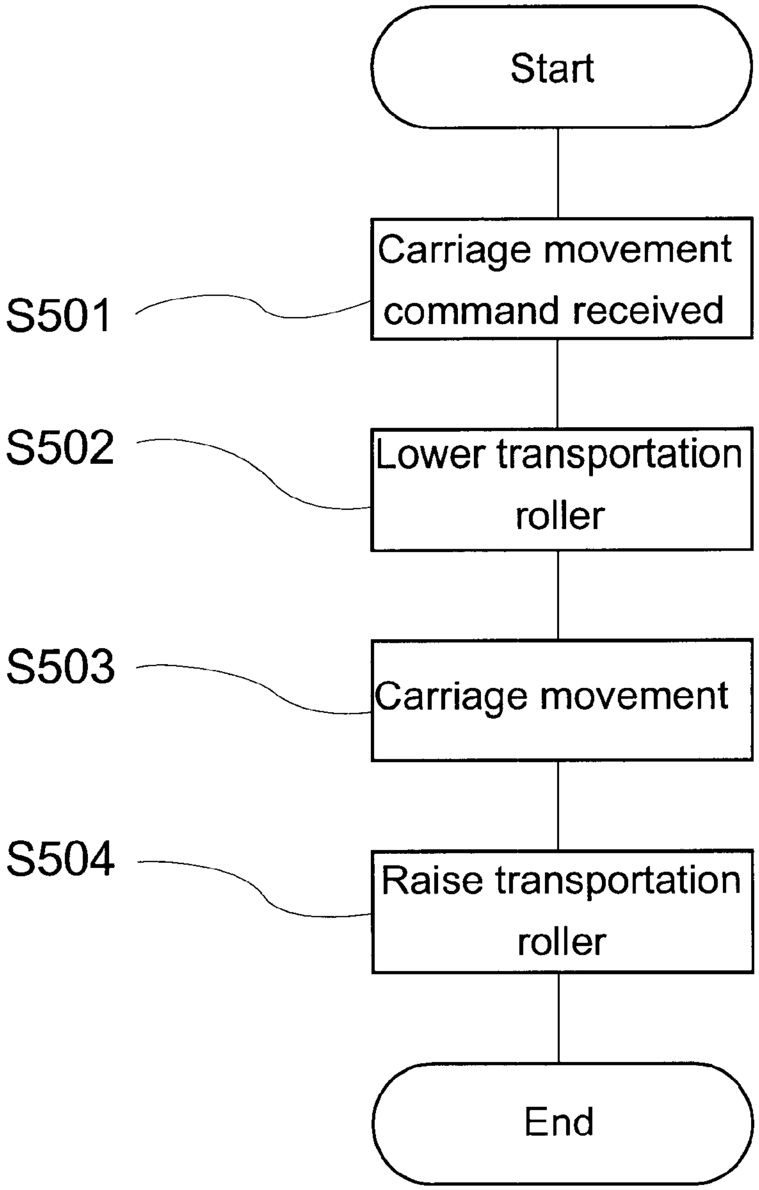
FIG. 5 is a flow chart of a control method for handling carriage movement commands according to a first embodiment of the present invention.

FIG. 5 is a flow chart of a control method used when a command involving carriage movement is received by a printing apparatus according to the present embodiment. Operation of the printing apparatus 1 when such a command is received is described with reference to FIG. 3 and FIG. 5.

When a command involving carriage movement (simply "carriage movement command" below) is received (S501), the printing apparatus 1 lowers the transportation roller 15*a* (S502) whether or not a slip form P is on the tray 2. If a slip form P is on the tray 2 at this time, the slip form P is thus clamped between the transportation rollers 15*a* and 15*b*. The drive motor 14 of carriage 12 is then driven, and the carriage 12 is moved according to the carriage movement command (S503). If the carriage movement command is a return home command, the carriage 12 is moved to the home position. When the carriage 12 stops moving, the transportation roller 15*a* is raised (S504). Any slip form P clamped between the transportation rollers 15*a* and 15*b* is thus released.

It should be noted that the transportation rollers 15 can be driven a specific distance after step S502 and before the carriage 12 is moved in step S503. If the transportation rollers 15 are driven, they are driven in the direction opposite arrow A in FIG. 2, that is, toward the open end of the tray, a distance sufficient to eject the slip form P. If a slip form P is not appropriately positioned, for example, if a slip form P is inserted diagonally to the transportation path, advancing the slip form P in the direction of arrow A has a good chance of causing a paper jam. As a result, the slip form P is transported in the opposite direction to eject the slip form P and prevent a paper jam from occurring.

Figure 6:
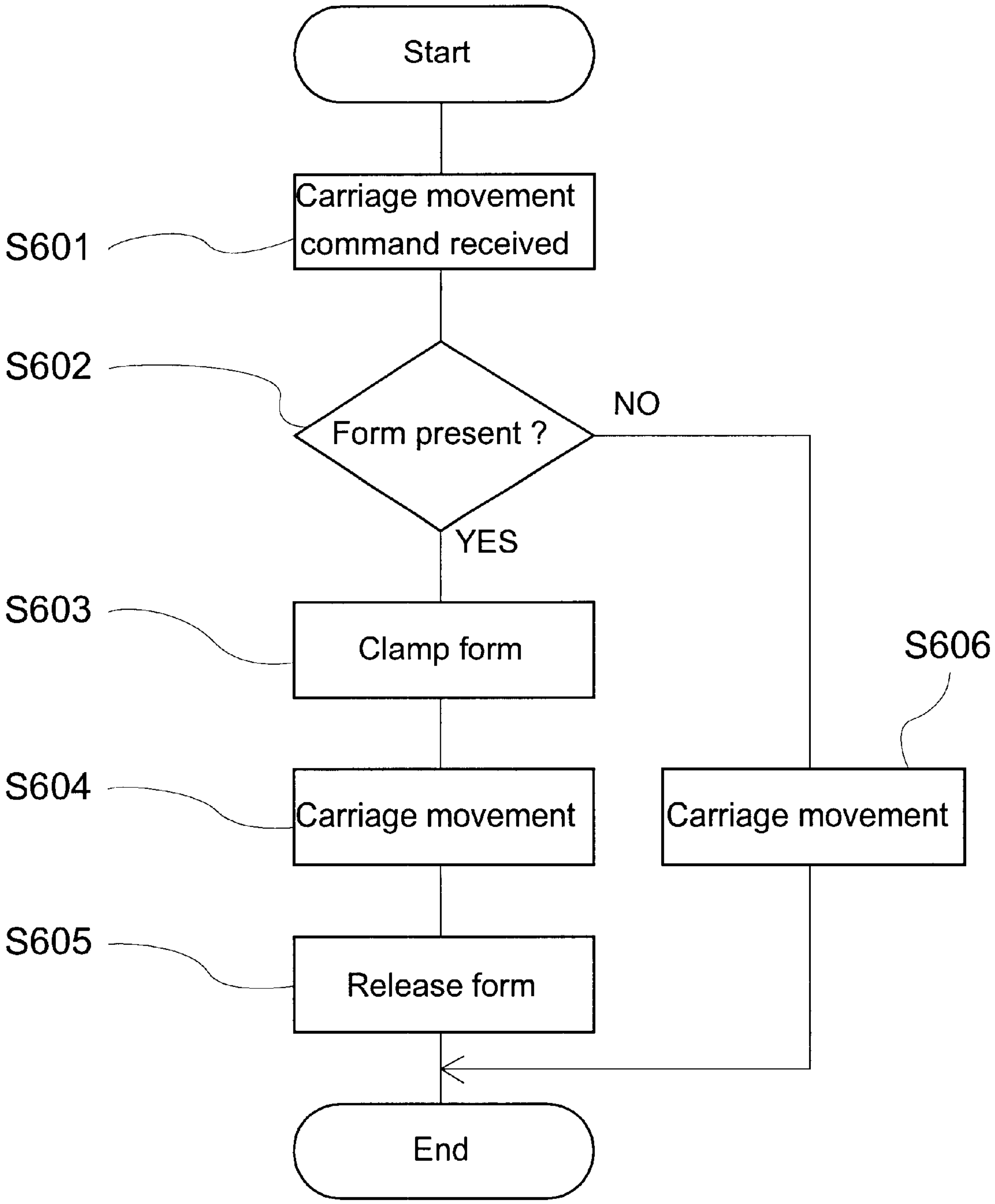
FIG. 6 is a flow chart of a control method for handling carriage movement commands according to a second embodiment of the present invention.

FIG. 6 is a flow chart of a control method used when a command involving carriage movement is received by a printing apparatus according to a second embodiment of the invention. With the control method illustrated in FIG. 5, the transportation roller 15*a* is raised and lowered or driven rotationally irrespective of whether a slip form P is on the tray 2. While this method simplifies the procedure to be executed when a carriage movement command is received, it also involves needless operation of the transportation rollers when a slip form P is not present, and creates extraneous noise. In the second embodiment, therefore, the presence of a slip form P is detected before the transportation roller 15*a* is driven, and the transportation rollers are operated only when a slip form P is determined present.

When a carriage movement command is received (S601) by the printing apparatus 1 using the control method shown in FIG. 6, the first step is to detect whether a slip form P is present (S602). This is accomplished using the form detectors 18 and 19. Note that this operation does not detect whether the slip form P is appropriately positioned, but simply determines whether either of the form detectors 18 and 19 detects a slip form P. If a slip form P is detected, the transportation roller 15*a* is lowered, and the slip form P is clamped (S603). The drive motor 14 is then driven to move the carriage 12 (S604). When carriage 12 movement ends, the transportation roller 15*a* is raised to release the slip form P (S605). If a slip form P is not detected in step S602, the carriage 12 is simply moved (S606) without operating the transportation roller 15*a* As a result, raising and lowering the transportation roller 15*a* when a slip form P is not present is eliminated.

Note, further, that the transportation rollers 15 can be driven a specific distance after step S603 to eject the slip form P before proceeding from step S604. Operation in this case involves the same process optionally inserted between steps S502 and S503 in FIG. 5 and described above.

Figure 7:
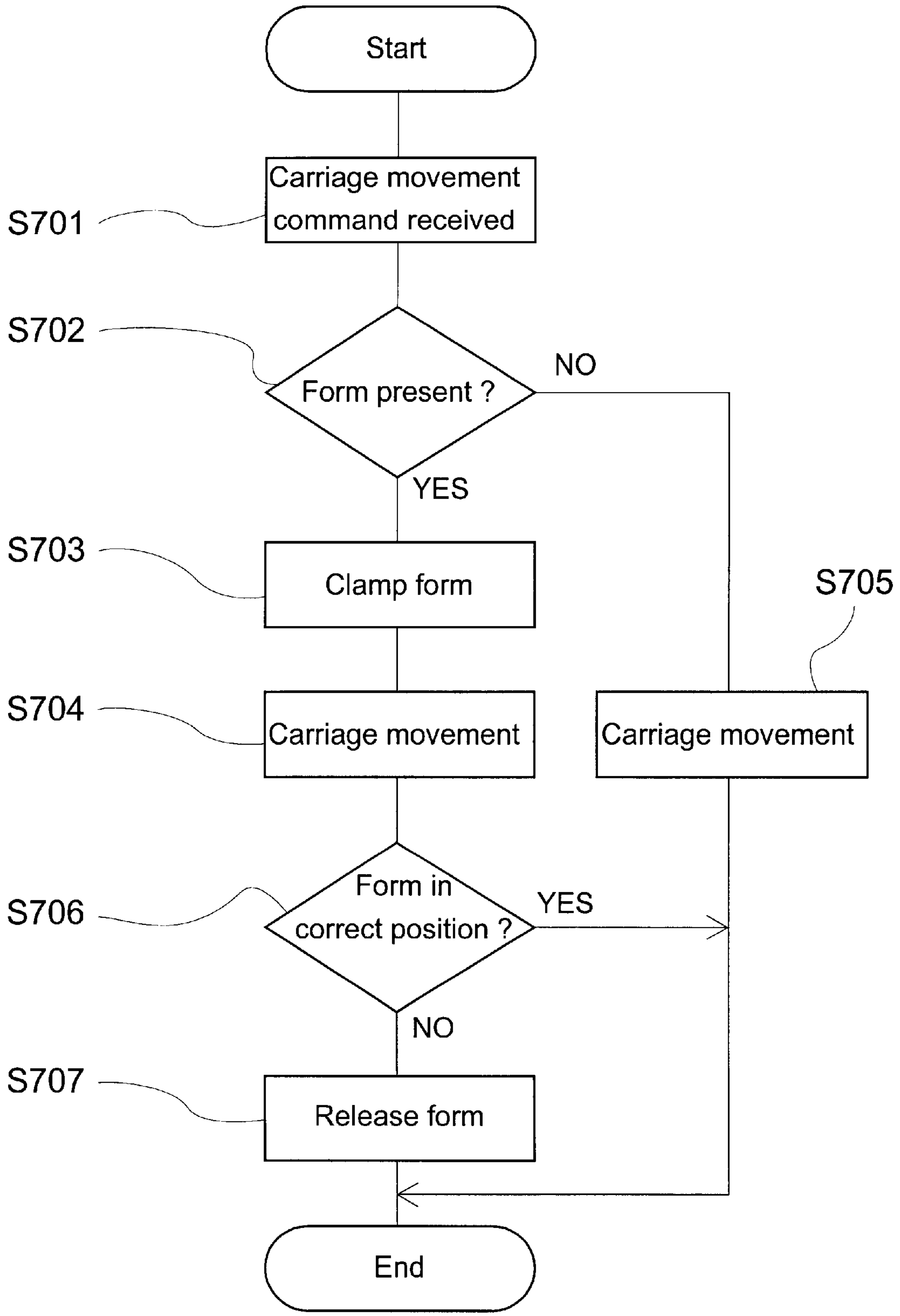
FIG. 7 is a flow chart of a control method for handling carriage movement commands according to a third embodiment of the present invention.

FIG. 7 is a flow chart of a control method used when a command involving carriage movement is received by a printing apparatus according to a third embodiment of the invention. This method is the same as that shown in FIG. 6 through carriage movement (S701–S704 and S705). It differs from the method shown in FIG. 6 in the procedure following carriage movement in step S704, that is, the procedure for releasing the clamped slip form P.

In the method of the third embodiment, it is determined whether the slip form P is correctly positioned after the carriage is moved using the form detectors 18 and 19 (S706). The slip form P is assumed to be correctly positioned when it is detected by both form detectors 18 and 19. If the slip form P is not positioned correctly, the slip form P is released (S707). If the slip form P is positioned correctly, it is already positioned and ready for printing, and the slip form P is therefore not released and remains held. Unnecessary operation of the transportation roller 15*a* can thus be reduced. The slip form P can also be released as required by simply operating the appropriate control button on the operating panel 5. If the slip form P is not appropriately positioned in step S706, the transportation roller 15, can be driven a specific distance after step S706 to eject the slip form P before proceeding to step S707. Operation in this case involves the same process optionally inserted between steps S502 and S503 in FIG. 5 and described above.

The control methods shown in FIGS. 5, 6 and 7 can be achieved by the CPU 6 of the printing apparatus 1 and a program implemented by the CPU 6. The program itself can be stored in a ROM 7 or other semiconductor memory or storage device provided in or connected to the printing apparatus 1.

The preceding embodiments of the present invention have been described with reference to a dot impact printer as exemplary of a printing apparatus used in connection with a cash register or other point-of-sale terminal for printing checks and other slip forms. The invention shall not, however, be limited to dot impact printers, and can be readily adapted by those skilled in the art for use with thermal printers, ink-jet printers, and other printers in which the print head is moved for printing. The printing apparatus of the invention can also be adapted for printers using a variety of recording media, including receipts, slip forms, labels, checks, invoices, delivery tickets, credit card charges, and other types of cut-sheet forms.

In accordance with embodiments of the present invention, the printing apparatus may comprise a plurality of transportation roller pairs, of which all or any part may be openable and closable. In addition, the transportation path can be either straight or curved. Note, further, that the form stop is not essential to the invention, and can be removed from the printing apparatus.

In a printing apparatus according to the present invention as described above, the printing medium is always held by a transportation roller whenever the carriage moves, thereby preventing the printing medium from protruding into the path of the carriage, and preventing paper jams and damage to the printing medium resulting from contact between the carriage and printing medium. This is particularly effective when the transportation path is straight because there is a greater tendency for the printing medium to lift into the carriage path. Furthermore, the same effect can be achieved when the printing apparatus is configured to eject the printing medium after it is clamped by the transportation rollers.

It is also possible to prevent unnecessary operation of the transportation rollers and extraneous noise from driving the transportation roller by first detecting the presence of a printing medium and operating the transportation rollers to clamp the medium only when determined present.

By detecting whether the printing medium is appropriately positioned when it is clamped, and then holding the printing medium clamped after moving the carriage, printing can also be started immediately after the carriage is moved.

Furthermore, the user can be prompted to reset the printing medium correctly by ejecting the printing medium when it is positioned incorrectly.

It will also be noted that the present invention allows a data storage medium recording a program implementing the method of the invention to be distributed and sold independently of the printing apparatus as a software product.

In addition, a printing apparatus and control method according to the present invention can be realized by executing a program recorded to the data storage medium of the invention in a printing apparatus.

While the invention has been described in conjunction with several specific embodiments, it will be evident to those skilled in the art in light of the foregoing description that many further alternatives, modifications and variations are possible. Thus, the invention described herein is intended to embrace all such alternatives, modifications, applications and variations as may fall within the spirit and scope of the appended claims.

What is claimed is:

1. A printing apparatus for printing to a printing medium by moving a print head orthogonally to a direction in which the printing medium is transported along a transportation path to a printing unit, said printing apparatus comprising:

a transportation roller pair selectively moveable between an open position and a closed position in which the transportation roller pair holds and transports the printing medium to the printing unit; and a driver to move the transportation roller pair;

a receiver to receive commands from a host device for controlling the operation of the printing apparatus; and a controller responsive to a print head moving command;

wherein the controller is adapted to cause, in response to each print head moving command, the driver to bring the transportation roller pair to the closed position prior to causing the print head to move, such that the transportation roller pair is always closed when the print head moves, and such that the print head moves after the transportation roller pair is closed to hold the printing medium but before the printing medium is advanced.

2. The printing apparatus as set forth in claim 1, further comprising:

a medium detector to detect if the printing medium is inserted in the transportation path;

wherein the driver is controlled to move the transportation roller pair to the closed position only when insertion of the printing medium has been detected by the medium detector.

3. The printing apparatus as set forth in claim 2, wherein the driver is controlled to move the transportation roller pair to the open position after moving the transportation roller pair to the closed position and executing the print head moving command.

4. The printing apparatus as set forth in claim 2, wherein the printing medium is ejected by the transportation roller pair after the transportation roller pair is moved to the closed position.

5. The printing apparatus as set forth in claim 2, wherein the transportation path is substantially straight.

6. The printing apparatus as set forth in claim 1, wherein the driver is controlled to move the transportation roller pair to the open position after moving the transportation roller pair to the closed position and executing the print head moving command.

7. The printing apparatus as set forth in claim 6, wherein the printing medium is ejected by the transportation roller pair after the transportation roller pair is moved to the closed position.

8. The printing apparatus as set forth in claim 6, wherein the transportation path is substantially straight.

9. The printing apparatus as set forth in claim 1, wherein:

a medium position detector detects if the printing medium is correctly positioned in the transportation path;

wherein after moving the transportation roller pair to the closed position and executing the print head moving command, the driver is controlled to not move the transportation roller pair to the open position when the printing medium is correctly positioned based on the detection result of the medium position detector, and the driver is otherwise controlled to move the transportation roller pair to the open position.

10. The printing apparatus as set forth in claim 9, wherein the medium position detector comprises:

a medium leading edge detector to detect the leading edge of the printing medium; and a medium side edge detector to detect the side edge of the printing medium.

11. The printing apparatus as set forth in claim 9, wherein the printing medium is ejected by the transportation roller pair when the printing medium is not correctly positioned based on the detection result of the medium position detector before the transportation roller pair is moved to the open position.

12. The printing apparatus as set forth in claim 1, wherein the printing medium is ejected by the transportation roller pair after the transportation roller pair is moved to the closed position.

13. The printing apparatus as set forth in claim 12, wherein the printing medium is ejected from the same side of the printing apparatus in which it was inserted.

14. The printing apparatus as set forth in claims 12, wherein the driver is controlled to move the transportation roller pair to the open position after ejecting the printing medium and executing print head moving command.

15. The printing apparatus as set forth in claim 1, wherein the transportation path is substantially straight.

16. The printing apparatus as set forth in claim 1, wherein, after the controller causes the driver to bring the transportation roller pair to the closed position in response to each print head moving command, the print head moves to the standby position, such that the transportation roller pair is always closed when the print head moves to the standby position.

17. A control method for a printing apparatus for printing to a printing medium by moving a print head orthogonally to a direction in which the printing medium is transported along a transportation path to a printing unit, said printing apparatus comprising a transportation roller pair selectively movable between an open position and a closed position in which the transportation roller pair holds and transports the printing medium to the printing unit, a driver to move the transportation roller pair between the open and the closed positions, and a receiver to receive commands from a host device for controlling operation of the printing apparatus, said control method comprising the steps of:

controlling the driver, in response to each print head moving command, to bring the transportation roller pair to the closed position; and moving the print head according to each print head moving command, only after the driver is controlled to bring the transportation roller pair to the closed position, such that the transportation roller pair is always closed when the print head moves, and such that the print head moves after the transportation roller pair is closed to hold the printing medium but before the printing medium is advanced.

18. The control method for a printing apparatus as set forth in claim 17, further comprising the step of:

ejecting the printing medium using the transportation roller pair after controlling the driver to move the transportation roller pair to the closed position.

19. The control method for a printing apparatus as set forth in claim 17, wherein the moving of the print head comprises moving the print head to a standby position according to each print head moving command, only after the driver is controlled to bring the transportation roller pair to the closed position, such that the transportation roller pair is always closed when the print head moves to the standby position.

20. A control method for a printing apparatus for printing to a printing medium by moving a print head orthogonally to a direction in which the printing medium is transported along a transportation path to a printing unit, said printing apparatus comprising a transportation roller pair selectively movable between an open position and a closed position in which the transportation roller pair holds and transports the printing medium to the printing unit, a driver to move the transportation roller pair between the open and the closed positions, a receiver to receive commands from a host device for controlling operation of the printing apparatus, and a medium detector to detect if a printing medium is inserted in the transportation path, said control method comprising the steps of:

detecting whether the printing medium is inserted in the transportation path using the medium detector when a print head moving command is received;

controlling the driver, in response to each print head moving command, to bring the transportation roller pair to the closed position when the printing medium is detected; and moving the print head according to each print head moving command, only after the driver is controlled to bring the transportation roller pair to the closed position, such that the transportation roller pair is always closed when the print head moves, and such that the print head moves after the transportation roller pair is closed to hold the printing medium but before the printing medium is advanced.

21. The control method for a printing apparatus as set forth in claim 20, further comprising the step of:

controlling the driver to not move the transportation roller pair to the open position when the printing medium is correctly positioned based on the detection result of the medium detector, and otherwise controlling the driver to move the transportation roller pair to the open position, after the print head movement step.

22. The control method for a printing apparatus as set forth in claim 21, wherein the printing medium is ejected by the transportation roller pair when the printing medium is not correctly positioned based on the detection result of the medium position detector before the transportation roller pair is moved to the open position.

23. The control method for a printing apparatus as set forth in claim 20, further comprising the step of:

ejecting the printing medium using the transportation roller pair after controlling the driver to move the transportation roller pair to the closed position.

24. The control method for a printing apparatus as set forth in claim 20, wherein the moving of the print head comprises moving the print head to a standby position according to each print head moving command, only after the driver is controlled to bring the transportation roller pair to the closed position, such that the transportation roller pair is always closed when the print head moves to the standby position.

25. A data storage medium for recording a control program of a printing apparatus for printing to a printing medium by moving a print head orthogonally to the direction in which the printing medium is transported along a transportation path to a printing unit, said printing apparatus comprising a transportation roller pair selectively movable between an open position and a closed position in which the transportation roller pair holds and transports the printing medium to the printing unit, and a driver to move the transportation roller pair between the open and the closed positions, said control program comprising:

controlling the driver to move the transportation roller pair to the closed position when a print head moving command is received; and and moving the print head according to each print head moving command, only after the driver is controlled to bring the transportation roller pair to the closed position, such that the transportation roller pair is always closed when the print head moves, and such that the print head moves after the transportation roller pair is closed to hold the printing medium but before the printing medium is advanced.

26. The data storage medium for recording a control program of a printing apparatus as set forth in claim 25, wherein the control program further comprises:

ejecting the printing medium using the transportation roller pair after the driver is controlled to move the transportation roller pair to the closed position.

27. The data storage medium for recording a control program as set forth in claim 25, wherein the moving of the print head comprises moving the print head to a standby position according to each print head moving command, only after the driver is controlled to bring the transportation roller pair to the closed position, such that the transportation roller pair is always closed when the print head moves to the standby position.

28. A data storage medium for recording a control program of a printing apparatus for printing to a printing medium by moving a print head orthogonally to the direction in which the printing medium is transported along a transportation path to a printing unit, said printing apparatus comprising a transportation roller pair selectively movable between an open position and a closed position in which the transportation roller pair holds and transports the printing medium to the printing unit, a driver to move the transportation roller pair between the open and the closed positions, and a medium detector to detect if the printing medium is inserted in the transportation path, said control program comprising:

detecting whether the printing medium is inserted in the transportation path using the medium detector when a print head moving command is received;

controlling the driver to move the transportation roller pair to the closed position when the printing medium is detected; and moving the print head according to each print head moving command, only after the driver is controlled to bring the transportation roller pair to the closed position, such that the transportation roller pair is always closed when the print head moves, and such that the print head moves after the transportation roller pair is closed to hold the printing medium but before the printing medium is advanced.

29. The data storage medium for recording a control program of a printing apparatus as set forth in claim 28, wherein the control program further comprises:

controlling the driver to not move the transportation roller pair to the open position when the printing medium is correctly positioned based on the detection result of the medium detector, and otherwise to control the driver to move the transportation roller pair to the open position, after the print head movement step.

30. The data storage medium for recording a control program of a printing apparatus as set forth in claim 29, wherein the printing medium is ejected by the transportation roller pair when the printing medium is not correctly positioned based on the detection result of the medium detector before the transportation roller pair is moved to the open position.

31. The data storage medium for recording a control program of a printing apparatus as set forth in claim 28, wherein the control program further comprises:

ejecting the printing medium using the transportation roller pair after the driver is controlled to move the transportation roller pair to the closed position.

32. The data storage medium for recording a control program as set forth in claim 28, wherein the moving of the print head comprises moving the print head to a standby position according to each print head moving command, only after the driver is controlled to bring the transportation roller pair to the closed position, such that the transportation roller pair is always closed when the print head moves to the standby position.

33. A printing apparatus for printing to a printing medium by moving a print head orthogonally to a direction in which the printing medium is transported along a transportation path to a printing unit, said printing apparatus comprising:

a transportation roller pair selectively moveable between an open position and a closed position in which the transportation roller pair holds and transports the printing medium to the printing unit; and a driver to move the transportation roller pair;

a receiver to receive commands from a host device for controlling the operation of the printing apparatus; and a controller responsive to a print head moving command;

wherein the controller is adapted to cause, in response to each print head moving command, the driver and the transportation roller pair to eject the printing medium prior to causing the print head to move.

34. A control method for a printing apparatus for printing to a printing medium by moving a print head orthogonally to a direction in which the printing medium is transported along a transportation path to a printing unit, said printing apparatus comprising a transportation roller pair selectively movable between an open position and a closed position in which the transportation roller pair holds and transports the printing medium to the printing unit, a driver to move the transportation roller pair between the open and the closed positions, and a receiver to receive commands from a host device for controlling operation of the printing apparatus, said control method comprising the steps of:

(a) controlling the driver, in response to each print head moving command, to bring the transportation roller pair to the closed position;

(b) ejecting the printing medium after step (a); and (c) moving the print head according to each print head moving command, steps (a) and (b) being performed prior to step (c).

35. A control method for a printing apparatus for printing to a printing medium by moving a print head orthogonally to a direction in which the printing medium is transported along a transportation path to a printing unit, said printing apparatus comprising a transportation roller pair selectively movable between an open position and a closed position in which the transportation roller pair holds and transports the printing medium to the printing unit, a driver to move the transportation roller pair between the open and the closed positions, a receiver to receive commands from a host device for controlling operation of the printing apparatus, and a medium detector to detect if a printing medium is correctly positioned in the transportation path, said control method comprising the steps of:

(a) detecting whether the printing medium is inserted in the transportation path using the medium detector when a print head moving command is received;

(b) controlling the driver, in response to each print head moving command, to bring the transportation roller pair to the closed position when the printing medium is correctly positioned and detected;

(c) ejecting the printing medium when the printing medium is not correctly positioned and detected; and (d) moving the print head according to each print head moving command, steps (a), (b) and (c) being performed prior to step (d).

36. A data storage medium for recording a control program of a printing apparatus for printing to a printing medium by moving a print head orthogonally to the direction in which the printing medium is transported along a transportation path to a printing unit, said printing apparatus comprising a transportation roller pair selectively movable between an open position and a closed position in which the transportation roller pair holds and transports the printing medium to the printing unit, and a driver to move the transportation roller pair between the open and the closed positions, said control program comprising:

(a) controlling the driver to move the transportation roller pair to the closed position when a print head moving command is received;

(b) ejecting the printing medium after step (a); and (c) moving the print head according to each print head moving command, steps (a) and (b) being performed prior to step (c).

37. A data storage medium for recording a control program of a printing apparatus for printing to a printing medium by moving a print head orthogonally to the direction in which the printing medium is transported along a transportation path to a printing unit, said printing apparatus comprising a transportation roller pair selectively movable between an open position and a closed position in which the transportation roller pair holds and transports the printing medium to the printing unit, a driver to move the transportation roller pair between the open and the closed positions, and a medium detector to detect if the printing medium is correctly positioned in the transportation path, said control program comprising:

(a) detecting whether the printing medium is inserted in the transportation path using the medium detector when a print head moving command is received;

(b) controlling the driver to move the transportation roller pair to the closed position when the printing medium is correctly positioned and detected;

(c) ejecting the printing medium when the printing medium is not correctly positioned and detected; and (d) moving the print head according to each print head moving command, steps (a), (b) and (c) being performed prior to step (d).

* * * * *

UNITED STATES PATENT AND TRADEMARK OFFICE
CERTIFICATE OF CORRECTION

PATENT NO. : 6,490,050 B2
DATED : December 3, 2002
INVENTOR(S) : Yoshikazu Ito

It is certified that error appears in the above-identified patent and that said Letters Patent is hereby corrected as shown below:

Column 10,
Line 41, delete “s” in claims,
Line 44, after “executing” insert -- the --.

Column 11,
Line 61, after “medium” delete “position”

Signed and Sealed this

Twenty-second Day of April, 2003

JAMES E. ROGAN
*Director of the United States Patent and Trademark Office*